US005138307A

United States Patent [19]
Tatsumi

[11] Patent Number: 5,138,307

[45] Date of Patent: Aug. 11, 1992

[54] DISPLAY DEVICE FOR MULTI MOVING PICTURES

[75] Inventor: Toshikazu Tatsumi, Higashiosaka, Japan

[73] Assignee: Matsushita Electric Industrial Co., Ltd., Osaka, Japan

[21] Appl. No.: 513,814

[22] Filed: Apr. 25, 1990

[30] Foreign Application Priority Data

Apr. 26, 1989 [JP] Japan .................................. 1-108610

[51] Int. Cl.[5] .......................... G09G 1/06; H04N 5/262

[52] U.S. Cl. .................................... 340/721; 340/734; 358/183

[58] Field of Search ........................ 340/703, 721, 734; 358/183, 22 PIP

[56] References Cited

U.S. PATENT DOCUMENTS

| | | | |
|---|---|---|---|
| 3,673,324 | 6/1972 | Ito et al. | 358/183 |
| 4,001,498 | 1/1977 | Morishita et al. | 358/183 |
| 4,117,512 | 9/1978 | Miyake et al. | 358/183 |
| 4,684,990 | 8/1987 | Oxley | 358/183 |
| 4,758,892 | 7/1988 | Bloomfield | 358/183 |
| 4,845,565 | 7/1989 | Macheboeuf | 358/183 |
| 4,935,815 | 6/1990 | Ichikawa et al. | 358/140 |

*Primary Examiner*—Alvin E. Oberley
*Assistant Examiner*—Amare Mengistu
*Attorney, Agent, or Firm*—Wenderoth, Lind & Ponack

[57] ABSTRACT

In a display device for displaying one or more moving pictures and a graphic picture on the same display unit, a plurality of moving picture units are provided; each a moving picture unit consists of an input unit, a frame picture and computer control unit, and a mixer for mixing the signals from the respective moving picture units and a graphic picture unit. Therefore, when the instruction producing unit provides an instruction, the mixer mixes the graphic picture and one or more moving pictures such that a graphic picture and a plurality of moving pictures can be displayed on the same display unit simultaneously.

1 Claim, 4 Drawing Sheets

DISPLAY DEVICE FOR MULTI MOVING PICTURES

BACKGROUND OF THE INVENTION

1. Field of the invention

The present invention relates to a display device for displaying at least one natural moving picture and a graphic picture including one or more characters used in such a picture information retrieval system by a computer.

2. Description of the prior art

An example of a conventional display device of the above kind is shown in FIG. 1, in which element 1 is a CPU; element 2 is an RBG separation circuit; element 3 is an A/D converter for converting the analog RBG signal output from the RBG separation circuit 2 to digital signals; 4 is asynchronizing signal separation circuit; element 5 is a master clock generation circuit; element 6 is a natural picture memory for storing natural picture information inputted through the NTSC terminal; element 7 is a graphic memory for storing graphic pictures or graphic images coming from CPU 1; element 8 is a display circuit for reading the picture data stored in the graphic memory 71 element 9 is a display color designating register for setting desired colors of the natural pictures to be displayed, the above, colors being selected from colors contained in the graphic pictures; element 10 is a selector switch for selecting picture data stored in the natural picture memory 6 and the graphic memory 7 in response to the output of a comparator 12 for comparing the data of the natural picture memory 6 and the data of the color designating register 9; element 11 is a D/A converter; element 13 is a display unit such as a CRT for displaying the picture output from the D/A converter 11.

In the above arrangement, the color designation area is depicted in the graphic memory 7 using the designated color values by the CPU 1. The values of the respective designated colors representing the colors for displaying the natural picture are set in the display color designating register 9 by the CPU 1.

The various characters and the graphic pictures stored in the graphic memory 7 and the natural picture stored in the natural picture memory 6 are respectively read out by CPU 1 in synchronism with the raster scanning of the display circuit 8 and the value read out from the graphic memory 7 is compared with the value read out from the color designating register 9 in the comparator 12. When the area of designated color is scanned, the switch 10 is switched towards the natural picture memory 6 side, and the output of the natural picture memory 6 is fed to the display unit 13, thereby displaying the natural picture so that the display unit 13 can display pictures containing the graphic picture with one or more characters and the natural picture.

However, in the conventional device mentioned above, only one moving picture can be displayed in one picture frame, despite the fact that the natural picture can be displayed with the graphic picture.

SUMMARY OF THE INVENTION

An essential object of the present invention is to provide a display device which is able to display a plurality of moving pictures or natural pictures with a graphic picture simultaneously so that an interface between the user and the moving pictures can be improved.

In order to accomplish the above object, according to the present invention, in a display device for displaying moving picture and graphic picture comprising an input unit for inputting moving picture information, a frame memory for storing the input moving picture information, a computer control unit for processing computer commands, a graphic memory for storing at least graphic pictures, a mixer unit for mixing the moving picture information and the graphic picture information, and means for producing an instruction of displaying the moving picture and graphic picture simultaneously on a display unit, there are provided a plurality of moving picture units each of unit consisting of an input unit, a frame picture and the computer control unit, and a mixer for mixing the signals from the respective moving picture units and the graphic picture.

Therefore, when the instruction producing unit provides an instruction, the mixer mixes the graphic picture and one or more moving pictures.

BRIEF EXPLANATION OF THE ATTACHED DRAWINGS

FIG. 1 is a block diagram of a conventional display device,

FIG. 2 a block diagram of a preferred embodiment of a display device for displaying multi moving pictures according to the present invention, FIG. 3 is a circuit diagram showing an example of a mixer for mixing the moving pictures and the graphic picture used in the color display device according to the present invention; and FIG. 4 is a circuit diagram showing an example of parallel connection of the moving picture units.

DETAILED DESCRIPTION OF THE PREFERRED EMBODIMENT

Figure 1:
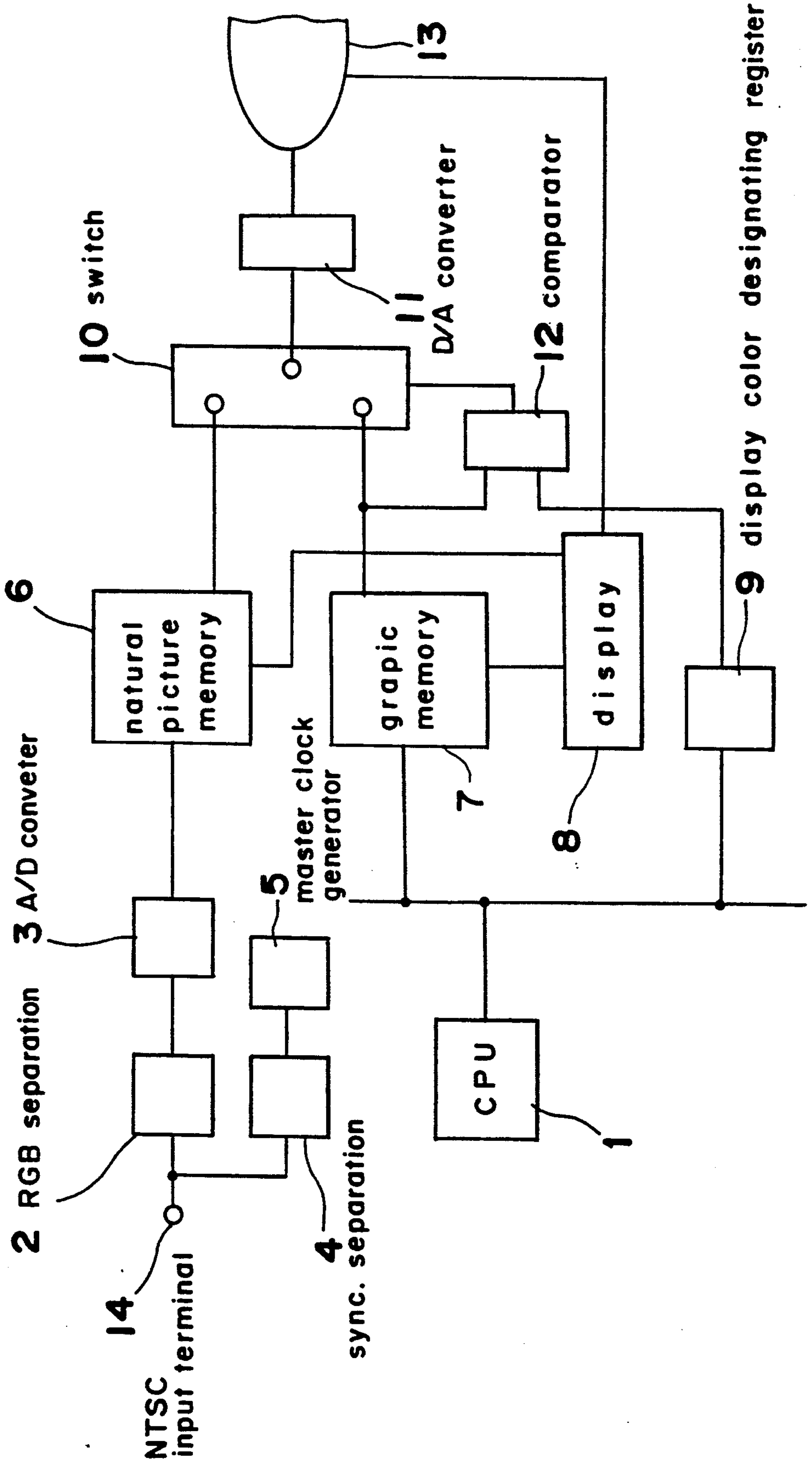
Fig. 1 (Prior Art)

A NTSC input terminal 20 for receiving NTSC color television signals which is processed in a moving picture unit 42 and which contain a color moving picture information or natural picture information (referred to as moving picture for the brevity hereinafter) as well as accompanied signals such as synchronizing signals is connected to a RBG separation circuit 21 and sync. separation circuit 23. The output of the RBG separation 21 is connected to a A/D converter 22 whose output is connected to a frame memory 25 for storing the moving picture data. The frame memory 25 comprises a pair of field memories for writing in and reading out alternately one field of the moving picture data fed from the A/D converter 22 representing the NTSC color television picture. The output of the frame memory 25 is connected to a frame memory output data terminal 32.

The output of the sync. separation circuit 23 is connected to a master clock generator 24 for generating master clock signals for controlling the various circuits shown in the drawings.

The moving picture unit 42 further comprised an address decoder 28 having its input terminal connected to personal computer (P.C.) terminals 34 to which graphic picture data is applied. The output of the address decoder 28 is connected to a register clock generator 29 whose input terminal is connected to the P.C. terminals. There is further provided a display color designating register 30 for setting any desired color to be displayed; the output thereof is connected to a display color designating value terminal 37 is another register. Elements 28–31 constitute a computer control unit 100.

Figure 2:
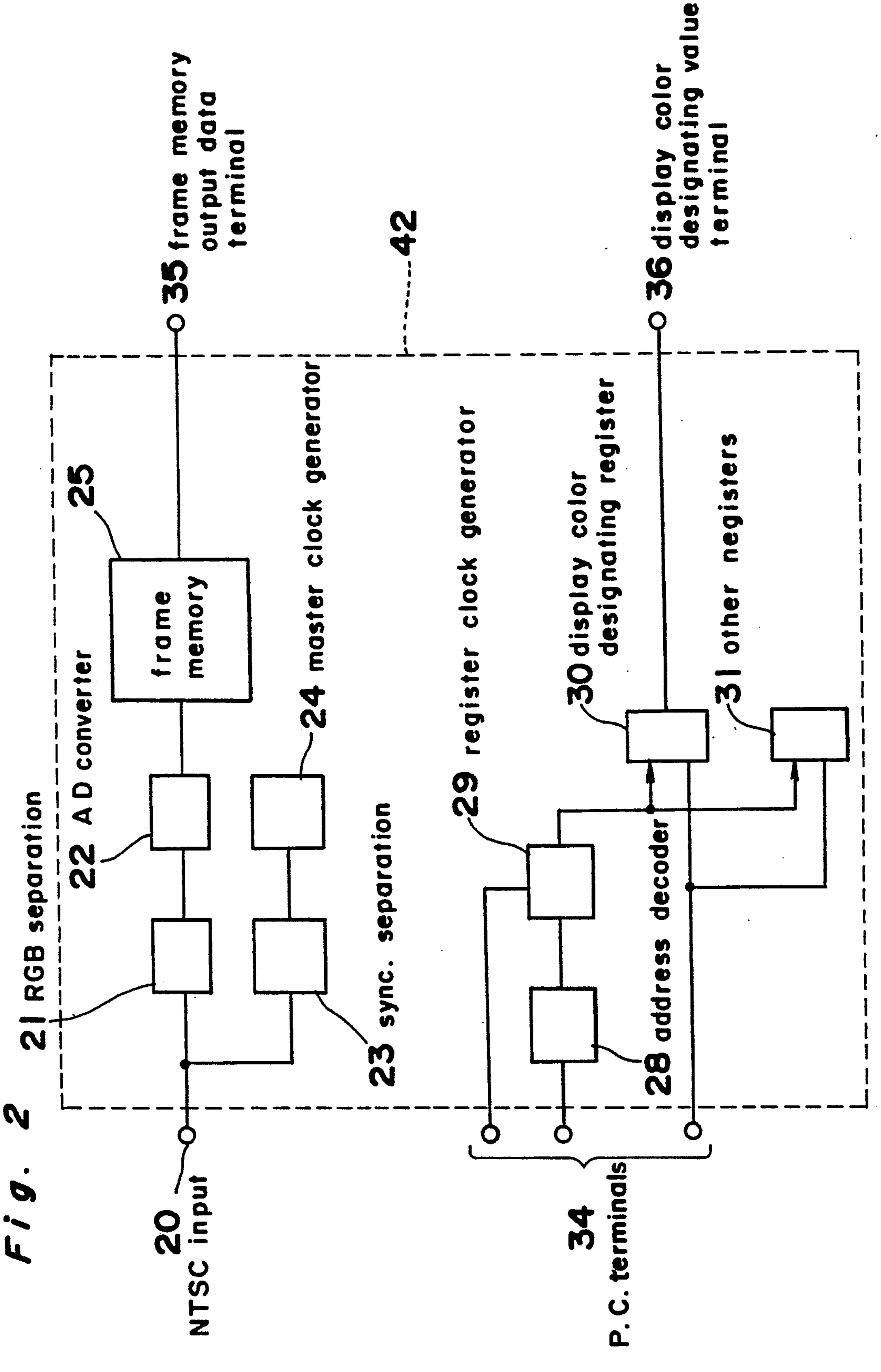
Figure 3:
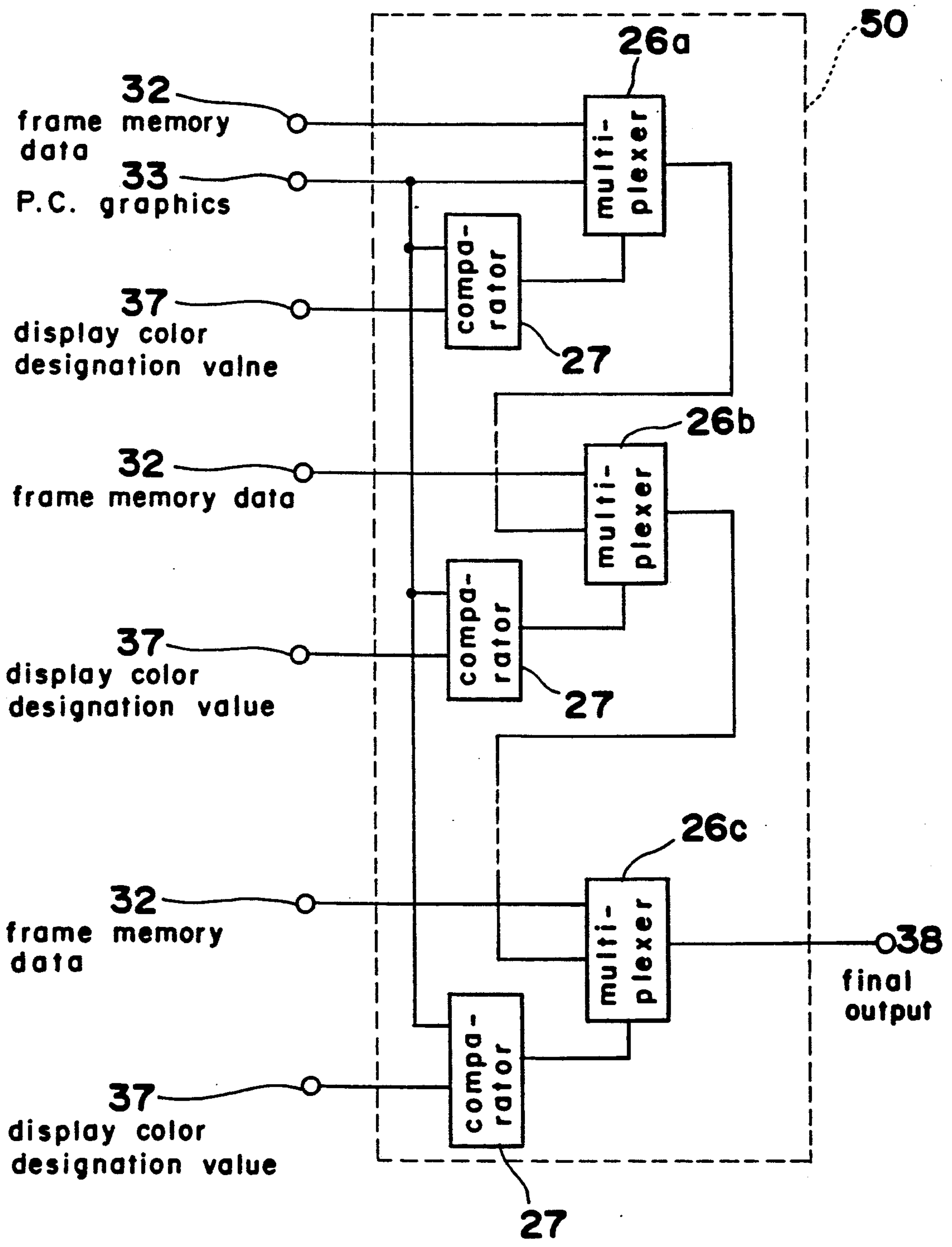

A mixer 50 for mixing the moving picture or moving pictures obtained from the moving picture unit 42 and the graphic picture fed from the personal computer (not shown) is shown in FIG. 3, in which elements 26*a*, 26*b* and 26*c* denote multiplexers, elements 27*a*, 27*b*, and 27*c* are comparators for comparing the color value of the P.C. graphic picture and the designated color values from terminals 37*a*, 37*b* and 37*c* elements 32*a*, 32*b*, and 32*c* are input terminals for receiving frame memory output data; elements 37*a*. 37*b*, and 37*c* are input terminals for receiving the value information from the three of display color designating registers 30 shown in FIG. 2. In FIG. 3, three sets of the multiplexers, comparators, and input terminals are provided for receiving the signals from three sets of the moving picture units 42.

In FIG. 3, element 33 is a P.C. graphic input terminal, and element 38 is an end output terminal.

In FIG. 3, a plurality of multiplexers 26*a*, 26*b* and 26*c* are connected in cascade and the first stage multiplexer 26*a* receives a moving picture at its one input terminal and a graphic picture at another input terminal. The second multiplexer 26*b* receives the output of the multiplexer 26*a* at its one input terminal and receives another moving picture fed from another moving picture unit 42 (not shown) and a further multiplexer 26*c* receives the output of the prior stage multiplexer and output of a further moving unit 42 (not show). Each of the multiplexers is controlled by the comparators 27*a*, 27*b* and 27*c* so that when the comparator produce an instruction at its output terminal by detecting the designated solid colored area in the graphic picture, the corresponding multiplexer multiplexes both signals applied to the two input terminals but when the comparator does not produce the instruction, the corresponding multiplexer merely passes the input signal fed from the prior stage multiplexer.

Figure 4:
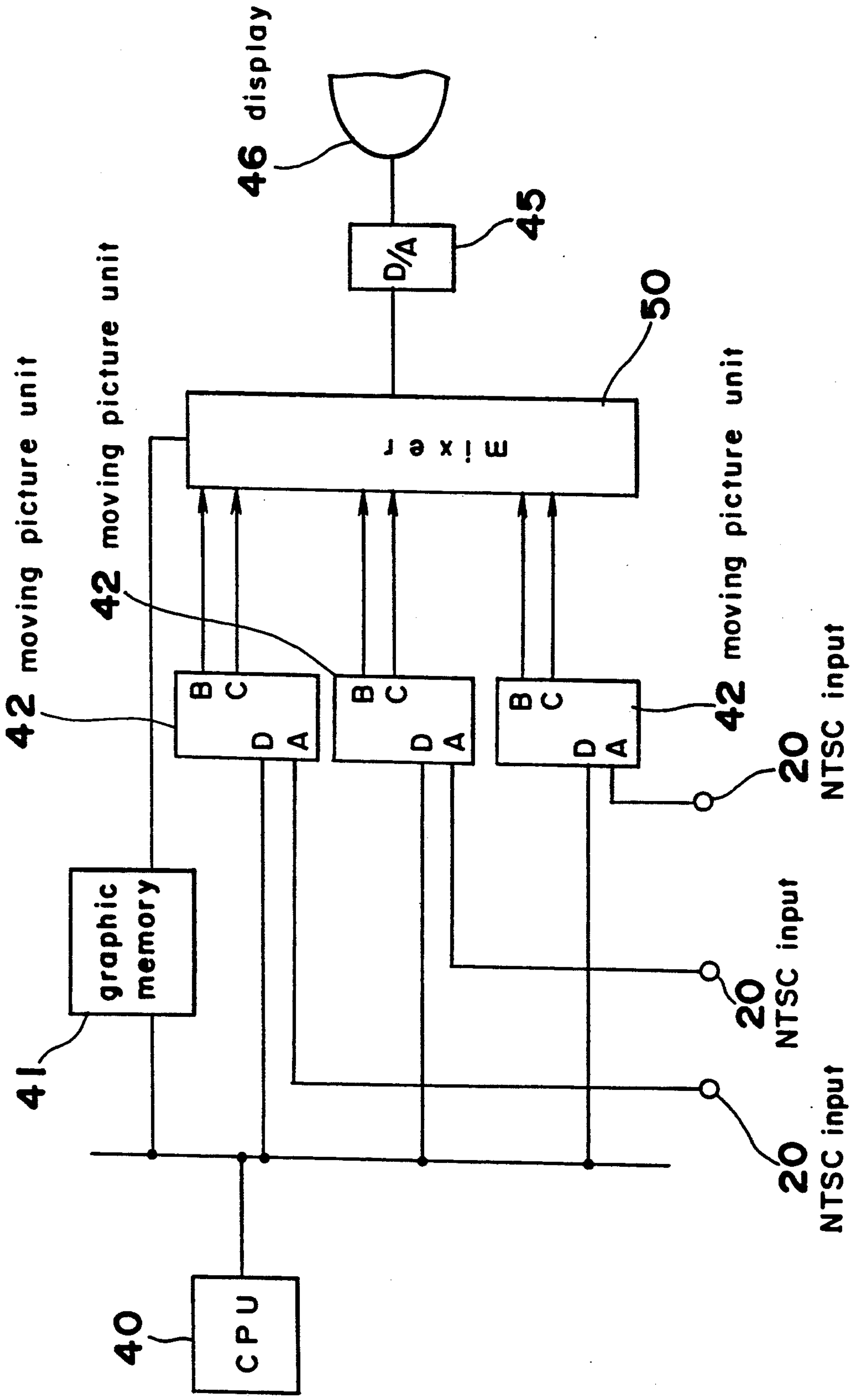

FIG. 4 shows an example of the connection of multiparallel connections of the moving picture units 42 in which element 40 is a CPU; element 41 is a graphic memory, element 45 is D/A converter and element 46 is a display unit such as a CRT.

The operation of the arrangement mentioned above follows hereinafter.

[1] A display color designation range is depicted in the graphic memory 41 using the designated display color from the CPU 40.

[2] Different values representing different colors which the user wishes to for displaying the natural picture are set in the display color designating register 30 of the moving picture units 42*a*–42*c* by the CPU 40.

[3] The characters and graphic images stored in the graphic memory 41 by the CPU 40 are input to the mixer 50.

On the other hand, the NTSC moving pictures are inputted to the moving picture units 42*a*–42*c* through the NTSC terminals 20*a*–20*c*.

[4] In the comparators 27*a*–27*c* of the mixer 50, the color values of the color value of the characters and graphic pictures are compared with the value of the display color designating register 30 of the moving picture units 42*a*–42*c*, then, when the solid colored portion painted by one of the designated colors is scanned, the output of the corresponding multiplexer 26*a*–26*c* is switched towards the frame memory 25 side of the moving picture units 42*a*–42*c* and other output of the multiplexers 26*a*–26*c* of is switched to the characters and graphics picture side, whereby the mixed character, graphic pictures and the moving picture are fed to the input terminal of the multiplexers 26*a*–26*c* of the subsequent stage.

[5] The output of the final multiplexer 26*c* is fed to the final output terminal 38 and converted to the analog signal from the digital signal by the D/A converter 45, further transferred to the display device 46, whereby the moving picture is displayed with the graphic picture. As shown in FIG. 3, in the present embodiment, since three moving picture units 42*a*–42*c* are connected to the mixer 50, in case the respective color values are found in the graphic picture by the comparators 27*a*–27*c*, that is to say, the areas in the graphic picture each of which is painted solidly in the designated color are scanned, a plurality of the moving pictures corresponding to the scanned colors can be displayed with the graphic picture on the same display unit simultaneously.

Therefore, according to the present embodiment, a plurality of moving pictures can be displayed with graphic picture by connecting a plurality of the moving picture units to the mixer 50.

When the scanning of the area painted in the designated color is finished, the instruction of the comparator corre-sponding to the designated color disappears and the corre-sponding moving picture also disappears from the display unit.

As mentioned above, according to the present invention, a plurality of moving pictures can be displayed on a single display unit simultaneously, whereby it is possible to improve the interface between the user and a plural moving pictures. Therefore, a monitor can see a plurality of moving pictures simultaneously on one display, and the monitor work can therefore be reduced.

What is claimed is:

1. A display device for displaying moving pictures and graphic pictures comprising an input unit for inputting moving picture information, a frame memory for storing the input moving picture information, a computer control unit for processing computer commands, a graphic memory for storing at least graphic pictures, a mixer unit for mixing the moving picture information and the graphic picture information, and a means for producing an instruction for displaying moving pictures and graphic pictures simultaneously on a display unit, the improvement comprising:

a plurality of moving picture units, each moving picture unit consisting of an input unit, a frame picture and a computer control unit, and a means for mixing moving picture information signals output from the respective moving picture units;

wherein said mixing means comprises a plurality of multiplexers connected in cascade, wherein the first multiplexer receives a first moving picture signal and the graphic picture signal and the subsequent multiplexers receive separate moving picture information at one input terminal thereof and the output of the previous multiplexer at another input terminal thereof.

* * * * *